United States Patent Office 3,432,828
Patented Mar. 11, 1969

Fig. 2
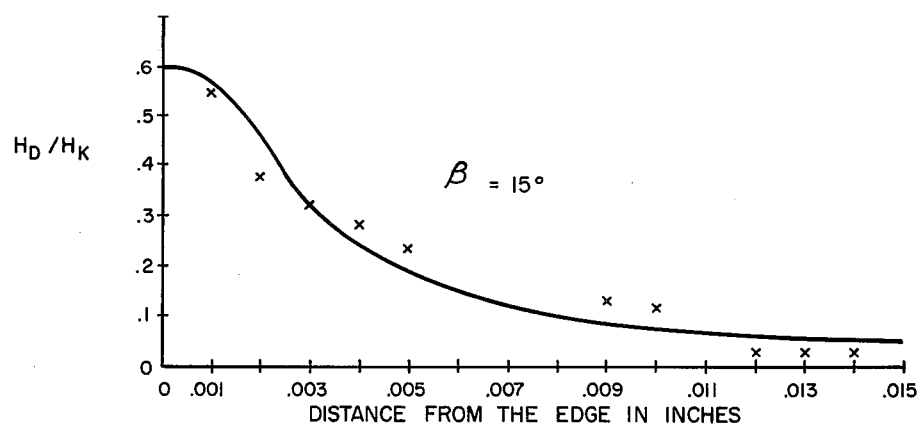
Fig. 3 — MAGNITUDE OF THE DEMAGNETIZING FIELD AS A FUNCTION OF DISTANCE FROM THE EDGE OF A 500A THICK PERMALLOY FILM DEPOSITED THROUGH A MASK. THE DEMAGNETIZING FIELD IS NORMALIZED TO $H_K$, AND $\beta$ IS 15°.

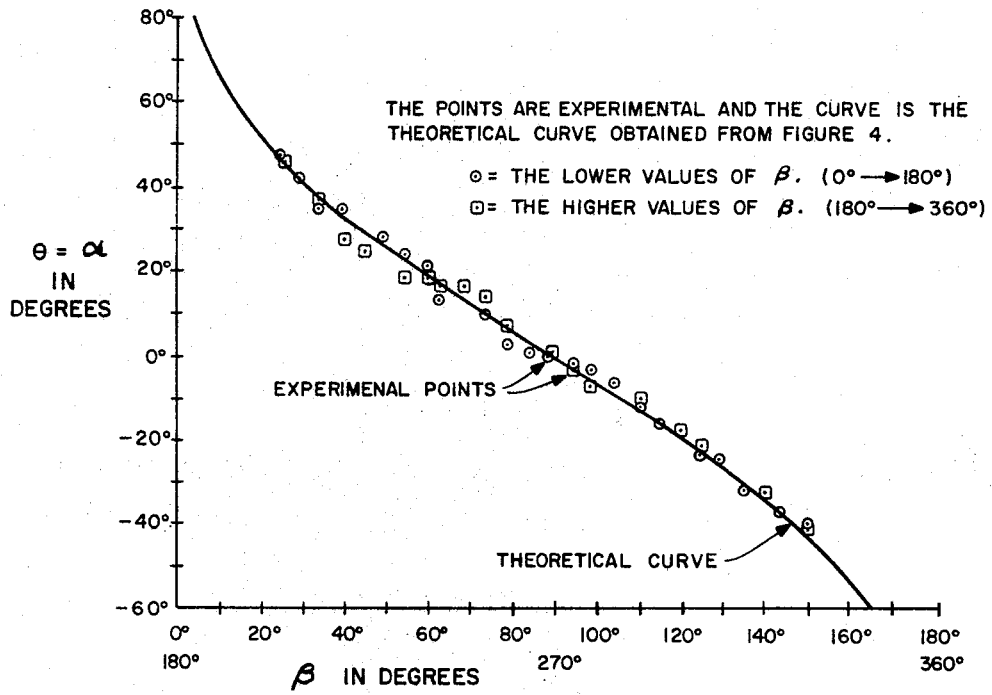
Fig. 5 ANGLE BETWEEN THE MAGNETIZATION AT THE EDGE OF A 500 A THICK, 50-MIL DIAMETER CIRCULAR PERMALLOY FILM, AND THE EASY AXIS AS A FUNCTION OF THE ANGLE BETWEEN THE NORMAL TO THE EDGE AND THE EASY AXIS AT ZERO APPLIED FIELD.
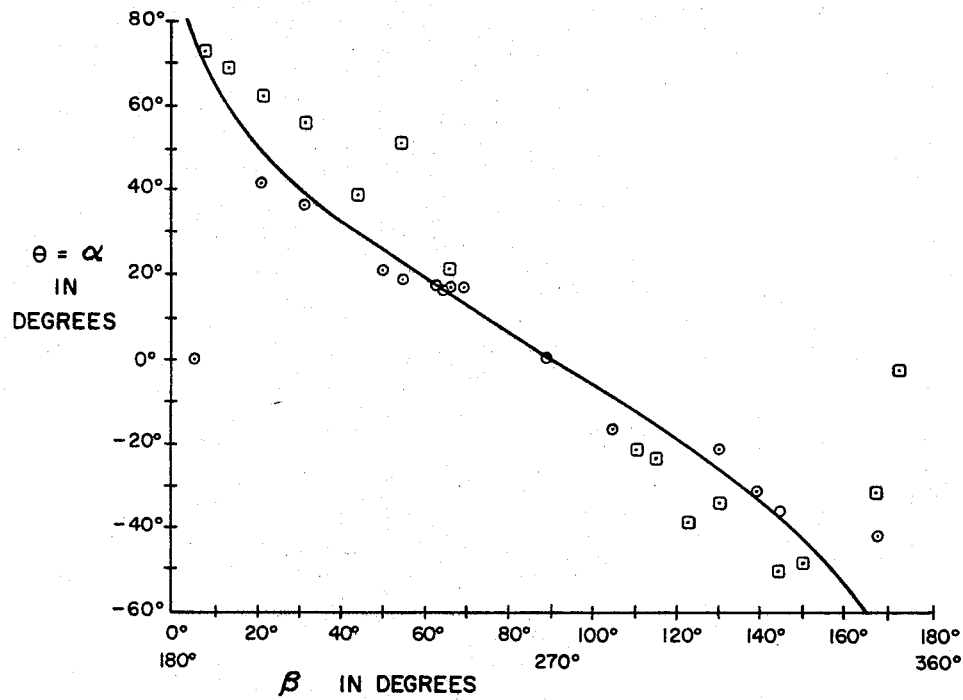
Fig. 6 SAME AS FIGURE 5 EXCEPT THE FILM HAS A VERY LARGE AMOUNT OF INHOMOGENEITY IN THE ORIENTATION OF THE LOCAL EASY AXIS.

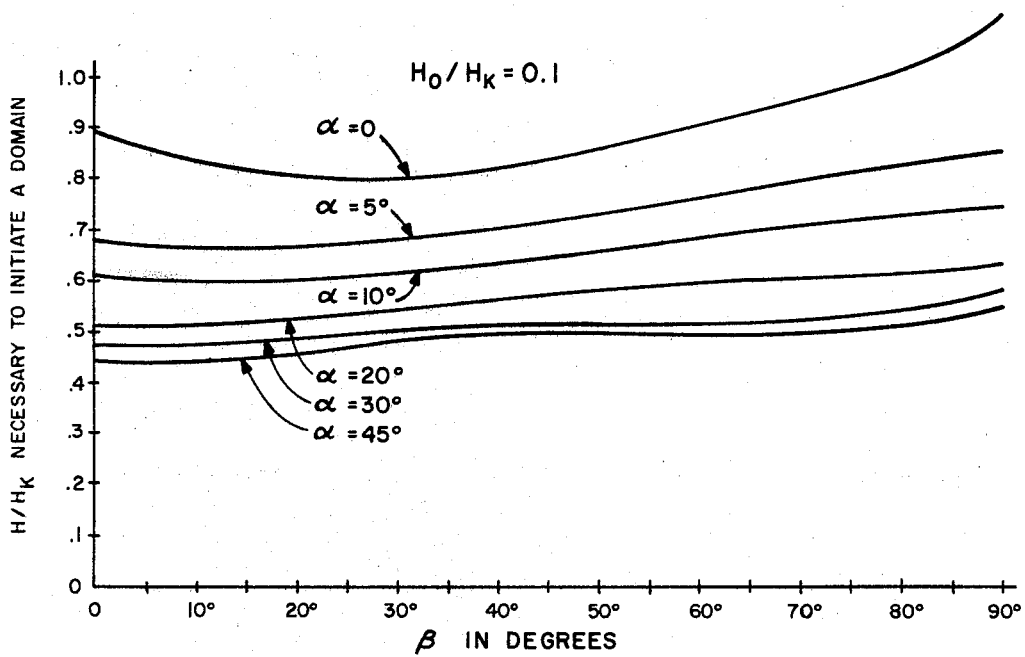
Fig. 7 FIELD NECESSARY TO INITIATE A REVERSE DOMAIN AS A FUNCTION OF $\beta$ FOR VARIOUS ANGLES, $\gamma$, BETWEEN EASY AXIS AND APPLIED FIELD FOR A FILM WITH $H_O/H_K = 0.1$
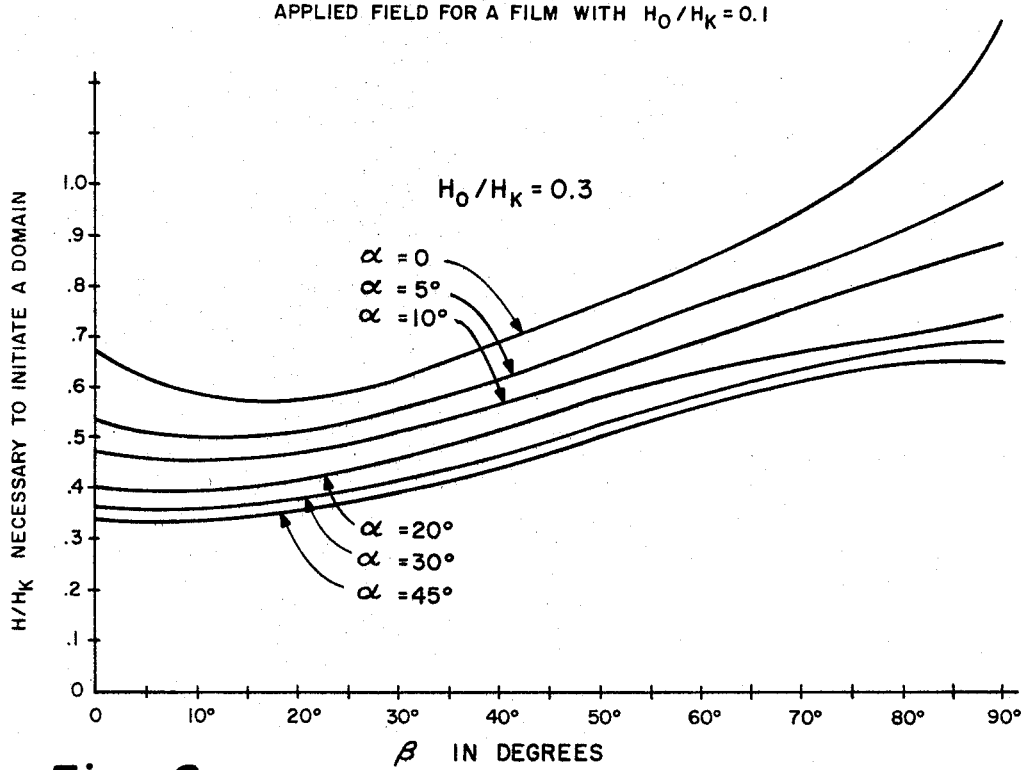
Fig. 8 SAME AS FIGURE 7 EXCEPT $H_O/H_K = 0.3$

3,432,828
SHARP THIN FERROMAGNETIC FILM
Paul D. Barker, Minneapolis, and Ernest J. Torok, St. Paul, Minn., assignors to Sperry Rand Corporation, New York, N.Y., a corporation of Delaware
Filed Sept. 29, 1964, Ser. No. 400,183
U.S. Cl. 340—174    2 Claims
Int. Cl. G11b 5/00

ABSTRACT OF THE DISCLOSURE

An open flux path core of thin ferromagnetic material having single domain properties providing single domain rotational switching and having the property of uniaxial anisotropy. The invention relates, in particular, to the planar contour of such core whereby a line normal to the edge of such core forms an angle $\beta$ with the anisotropic axis, which angle $\beta$ is everywhere greater than 45°.

---

The value of the utilization of small cores of magnetic material as memory elements in electronic processing systems is well known. This value is based upon their bistable characteristics which include the ability to retain, or remember, magnetic conditions which may be utilized to indicate a binary "1" or a "0." As the use of the cores in memory systems increases, a primary means of improving the computational speed of the associated computer is to devise means for decreasing the time required to switch the core from one magnetic state to the other and for decreasing the memory system cycle time, i.e., minimum time allowable between consecutive memory system readout or write-in. Also, as the cost of the memory system makes up a substantial portion of the total cost of the associated electronic data processing system, new methods and techniques of achieving reliable and economical interconnections of the cores of the memory system area continually sought.

The present invention relates to open flux path cores of thin ferromagnetic material and are described as having single domain properties. The term "single domain property" may be considered the characteristics of a three dimensional element of magnetizable material having a thin dimension that is substantially less than the width and length thereof wherein no magnetic domain walls can exist parallel to the large surface of the element. Such elements are well known in the art and may be fabricated by a vapor deposition process such as disclosed in the Rubens et al. Patent No. 2,900,282 and which may be assembled and operated as multi-element devices as disclosed in the Rubens et al. Patent No. 3,030,612. Such thin ferromagnetic elements, sometimes referred to as thin films, when fabricated and assembled in accordance with the above referred to patents provide memory systems of a volumetric efficiency, i.e., memory elements per cubic inch, thousands of times that of conventional ferrite toroidal core memory systems. Typical thin films are usually circular spots of 0.050 inch in diameter and 1500 A. (Angstrom units) thick. Such thin films when driven by appropriate driving fields, switch, i.e., the remanent magnetization thereof rotates 180° from a first remanent magnetic state to a second and opposite remanent magnetic state, in the single domain rotational mode. The switching of the remanent magnetization of the thin film in the single domain rotational mode is one of the primary purposes for the utilization of thin film elements. Single domain rotational switching is of the order of 10 to 100 times faster than that of wall motion switching which is the conventional switching apparatus achieved in toroidal ferrite core operation.

As a signal induced in a sense line coupled to a memory element is a function of the time rate of change of the magnetic field coupled to the sense line the faster the switching process the greater the induced signal. Consequently, to utilize the magnetic characteristics of thin films to the optimum degree it is desirable that the switching of such elements be achieved by the single domain rotational mode. The above noted Rubens et al Patent No. 3,030,612 discloses a switching threshold for such thin films which switching threshold provides a design criterion for the characteristics of the drive field that is to achieve single domain rotational switching of a thin film. However, it is a characteristic of such thin films that due to their open flux path nature demagnetization fields arise from the formation of free poles at the film's edge. Such demagnetizing fields cause the hysteresis loop characteristic of the thin film to shear. The effect of the demagnetizing fields produced by the free poles at the film's edge is to cause localized areas (reverse domains) of magnetization that are in magnetic opposition to the magnetization of the main portion of the thin film. These reverse domains are separated from the main magnetization of the thin film by either Bloch or Néel walls which walls tend to "creep" through the main magnetization portion of the film when such film is subjected to stray fields, thus, destroying the information stored in the film. This magnetization creep is a major problem in thin film memories. This creep of the reversed magnetization of the small free pole areas is in effect a wall motion switching phenomena but a particularly vicious one, because the film in some cases will become demagnetized at a field only one-tenth as large as that necessary for rotational switching. Such fields can come from the earth's magnetic field or half-select or air coupled random drive fields of memory systems. Consequently, to achieve the optimum switching mode operation of a thin film it is necessary that the reverse domains at the edge of the film that arise from the free poles at the edges of the film be eliminated. An excellent discussion of this problem of domain wall creeping in thin films is discussed in the article by Simon Middelhoek, Z. Angew. Phys., vol. 14, 1962, pp. 192–193. (German; Journal of Applied Physics.)

As it is desirable to increase the volumetric efficiency of magnetic memory systems utilizing thin films, considerable effort is being expended upon the determination of means whereby the size of the thin film may be decreased. As the size of the thin film is decreased the demagnetizing fields increase, and as discussed above, the demagnetizing fields arising from free poles at the edges of the films cause the hysteresis loops of such films to shear and to become unstable. Consequently, considerable research is being devoted to the determination of methods of diminishing or eliminating the deleterious effects of the demagnetizing fields normally associated with thin films. One method used to diminish the magnitude of the demagnetizing field is the provision of a suitable high permeability backing material, such as Hypersil, in suitable magnetic relationship with the thin film so as to complete the otherwise open flux path thereof and thereby reduce the free pole effect therein. Additionally, the use of two thin films of differing coercivities to provide nondestructive readout memory elements such as disclosed in the A. V. Pohm et al. Patents Nos. 3,015,807 and 3,125,743 achieves a desirable reduction in such demagnetizing fields. A still further arrangement to achieve nondestructive readout in magnetic memory elements is that disclosed in the R. L. Moore Patent No. 3,095,555 which comprises three magnetically-coupled differing-coercivity thin films, all of differing coercivities and substantially reducing the demagnetizing fields arising from such free poles at the edges of the information containing thin film. However, such methods involve the use of additional elements thereby requiring a more complex magnetic memory element. A still further attempt to reduce the demagnetizing fields arising from free poles at the edges of thin films is that of the tapered magnetic thin film disclosed in the A. V. Pohm et al. Patent No. 3,117,885 wherein it is disclosed that if a thin film is so formed during the deposition process to have a cross sectional area substantially similar to a one-half part of an oblate ellipsoid the demagnetizing fields would be substantially reduced. However, such tapered thin film requires rather particular relative concentrations of the magnetizable material in the film area during deposition, thus complicating the ordinary methods whereby a simple planar mask is utilized. As disclosed in the copending patent application of P. O. Oberg et al., Ser. No. 332,220, filed Dec. 20, 1963, now Patent No. 3,336,154, such planar mask normally comprises a planar material having suitably shaped apertures therethrough. During deposition the vaporized magnetizable material passes through such apertures and is deposited upon the thin film substrate with the planar contour of such thin films being determined by the planar contour of such apertures. Consequently, it is highly desirable that such simple masking technique be utilized during the vapor deposition process while forming thin films of such a planar contour that substantially reduces the demagnetizing fields arising from the free poles at the edges of the films. The present invention is concerned with a particular planar contour of a thin film that substantially decreases the deleterious affect of demagnetizing fields arising from such free poles.

Applicants' invention concerns the discovery that if a thin film has a planar contour that shall be defined herein as a "sharp film" the demagnetizing fields arising from the free poles at the edges of the film inhibit creep rather than cause it. Such films have much higher creep thresholds than films of prior art planar contours. For the purposes of this application the term "sharp film" shall be defined as a thin film in which the angle $\beta'$ between the film edge and the field-induced easy axis is everywhere small, i.e., less than 45°. Applicants have discovered that there is provided in such edges a shape anisotropy field that is almost aligned with the film's magnetization field induced easy axis. The resultant anisotropy field in such edges is high and as a result provides a high resistance to the formation of reverse domains—which are necessary for creep. The shape anisotropy induced in such edges of the "sharp film" precludes the formation of domain walls when such film is affected by low intensity extraneous fields. Consequently, there is provided thereby a thin film that exhibits a high inherent resistance to the formation of reverse domains at the edges thereof without the need for a high permeability backing element to close the otherwise open flux path thereof or for the need for a complex cross-sectional contour therefor. Additionally, as the present invention deals only with the planar contour of such thin film, conventional fabrication techniques may be utilized. Such conventional techniques include: fractionating wire of the ring-wire or axial-wire type; crucible melt; wire feed on refractory posts; electroplating; chemical deposition; sputtering; and thermo-chemical decomposition.

Accordingly, it is a primary object of the present invention to provide an improved multi-stable-state thin film.

Another object of the present invention is to provide a thin film wherein the demagnetizing fields arising from free poles at the edges of the film are utilized to inhibit domain wall creep.

Another object of the present invention is to provide a thin film wherein the angle between the film edge and the field induced easy axis is everywhere small.

It is a still further object of the present invention to provide a thin film wherein the shape anisotropy field in any portion of the film's edge is substantially aligned with the field-induced easy axis.

It is a still further object of the present invention to provide a thin film that exhibits a substantially high inherent resistance to domain wall creep when subjected to low extraneous magnetic fields.

These and other more detailed and specific objectives will be disclosed in the course of the following specification, reference being had to the accompanying drawings in which:

FIG. 2 is a Lorentz micrograph of a 500 A. thick, circular, Permalloy thin film 50 mils in diameter.

FIG. 3 is a plot of the magnitude of the demagnetizing field as a function of the distance from the edge of a 500 A. thick Permalloy thin film.

FIG. 5 is a plot of the angle between the magnetization at the edge of a 500 A. thick, 50 mil diameter circular Permalloy film and the easy axis as a function of the angle $\beta$ between the normal to the edge and the easy axis at zero applied fields.

FIG. 6 is a plot similar to that of FIG. 5 except that the film has a very large amount of inhomogeneity in the orientation of the local easy axis.

FIG. 7 is a plot of the applied field necessary to initiate a reverse domain as a function of $\beta$ for various angles $\gamma$ between the easy axis and the applied field for a film of $H_o/H_k=0.1$.

FIG. 8 is a plot similar to that of FIG. 6 except for a film with $H_o/H_k=0.3$.

INTRODUCTION

The present invention is concerned with the nature of the magnetization vector at the edge of a thin film of ferromagnetic material having single domain properties and possessing the characteristic of uniaxial anisotropy. As the magnetizable material constituting the thin film terminates at the film edge, there is induced therein free magnetic poles. These free poles create a demagnetizing field which affects the orientation of the magnetization vector, causing it to bend, or "curl" at the film edge. Thin films when deposited in an evacuable enclosure through a planar contour defining mask have a tapered film edge formed thereby due to the spacial distribution of the vaporized magnetizable material. This taper distributes the magnetic poles over a finite area reducing the demagnetizing field due to the tapering effect thereof. Both the magnitude and direction of the demagnetizing field are a sensitive function of the taper of the film edge; for example, if the thickness of the film, as a function of the distance from the center, is proportional to that of an ellipsoid of revolution the demagnetizing field is everywhere constant in both magnitude and direction and the demagnetizing field is at a minimum—see Pohm et al. Patent No. 3,117,885. This demagnetizing field causes not only "curling" at the film edge but also causes a reverse domain to form at a value of applied field considerably smaller than that required when no demagnetizing field is present. The present invention discloses a sharp film in which the angle between the film edge and the field-induced easy axis is everywhere small thereby causing a shape anisotropy field easy axis in the film edge that is substantially aligned with the field induced easy axis. This relationship of shape anisotropy field easy axis with the magnetization field-induced easy axis provides a resultant anisotropy field in the film edge that is very high and precludes the formation of reverse domains in such film edges when such film is subjected to low random drive fields.

DEMAGNETIZING FIELD

Figure 1:
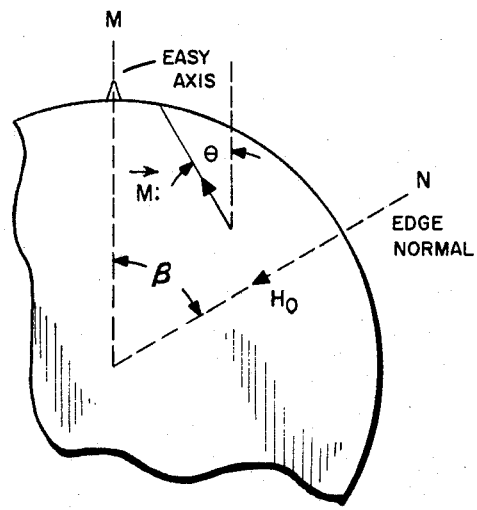
FIG. 1 is an illustration of the edge of a thin film depicting the relationships of the field-induced easy axis, the field normal to the film edge and the demagnetizing field.

In the region of the thin film near the edge of the film, i.e., the film edge, the direction of the demagnetizing field is in general normal to such film edge; the magnitude of this field can be measured by measuring the direction of the magnetization vector in this region from electron micrographs. With particular reference to FIG. 1 there is illustrated the relationship between the film's easy axis M, the normal to the film edge N, and the demagnetizing field $H_o$; $\beta$ defining the angle between the film's easy axis and the line normal to the film edge; and $\theta$ defining the angle between the local magnetization vector $\vec{M}$ in the film edge and the film's easy axis. For the magnetization vector to be in equilibrium, the resultant torque at every point in the film must be zero. The exchange torque is important when the magnetization vector changes direction by several degrees within the distance of 1000 Angstroms (as in a Bloch or Néel wall); however, this torque is unimportant in comparison with other torques when the bending of the magnetization takes place over a distance of several mils, as in the edge of the "curl." Therefore, the equilibrium equation may be found by setting the sum of the torques due to the anisotropy field $H_k$, the applied field, $\vec{H}$, and the demagnetizing field, $\vec{H}_d = 0$.

$$\hat{k}_0 H_k M \sin \theta \cos \theta = \vec{H} \times \vec{M} + \vec{H}_d \times \vec{M} \qquad (1)$$

where $\vec{M}$ is the magnetization vector and $\hat{k}_o$ is the unit vector normal to the plane of the film. The demagnetizing field direction is substantially perpendicular to the edge of the film. With particular reference to FIG. 2, there is illustrated a Lorentz micrograph of a 500 A. thick Permalloy film 50 mils in diameter. As the magnetization at a particular area of the film is always perpendicular to the ripples, FIG. 2 is an orthogonal map of the magnetization vector. From the micrograph of FIG. 2 and the relationships of Equation 1 above, FIG. 3 is a plot of the magnitude of the demagnetizing fields as a function of the distance from the edge of the film for $\beta = 15°$.

AN APPROXIMATION OF THE BEHAVIOR OF THE MAGNETIZATION AT THE EDGE

The exact theoretical equation for the magnetization vector at the edge of the film is a complicated nonlocal nonlinear integral-differential equation. Nevertheless, an approximation may be made for the condition $H_d/H_k \ll 1$; even when this condition does not hold the approximation is of some value. The result of this approximation is that the region near the edge of the film may be considered to have a shape anisotropy field superposed upon the field-induced anisotropy field. The easy axis of this shape anisotropy field is parallel to the edge of the film; the magnitude of this field is a maximum at the edge and decays in the interior. The shape anisotropy field and the field-induced anisotropy field are superposed into a resultant uniaxial anisotropy field, whose switching threshold determines the nucleation field of the film.

The approximation assumes that the shape of the curve of $H_d$ versus X—with $\beta$ constant—remains the same; only the amplitude of $H_D(x)$ varies as a function of $\beta$ or of the applied field. Mathematically this is expressed as $$\vec{H}_d(x, \beta, \vec{H}) = \vec{H}_d(\beta, \vec{H}) \cdot f(x)/f(0) \qquad (2)$$

where $x$ is the normal distance from the edge. This approximation is strictly true when $H_d/H_k \ll 1$ so that the magnetic poles along the edge arise primarily from the taper and not from the bending of the magnetization vector.

If we assume that the edge taper is the same all along the edge (that is for all $\beta$) then the magnitude of $H_o(\beta, \vec{H})$ will be proportional to the component of the magnetization vector at the edge normal to the edge. This is (see FIG. 1):

$$H_o(\beta, \vec{H}) = H_o(\beta=0, H=0) \cos (\theta + \beta)$$
$$= H_o(0) \cos (\theta + \beta) \qquad (3)$$

The magnitude of the torque due to $\vec{H}_o(0)$ acting along the indrawn normal to the edge (at an angle $d$ from the easy axis) is:

$$T_o = H_o(\beta, \vec{H}) M \sin (\theta + \beta)$$
$$= H_o(0) \cos (\theta + \beta) M \sin (\theta + \beta) \qquad (4)$$

The complete equation of equilibrium is found from Eqs. 1, 2 and 4:

$$H_T \cos \theta - H_L \sin \theta = H_k \sin \theta \cos \theta -$$
$$\frac{f(x)}{f(0)} H_o(0) \sin (\theta + \beta) \cos (\theta + \beta) \qquad (5)$$

(where $H_o$ is chosen positive, $H_L$ and $H_T$ are the components of the applied field parallel and perpendicular to the easy axis respectively).

Eq. 5 describes the direction of the magnetization vector throughout the film as a function of applied field. Because the equation is different at the edge of the film than at the center, there will be a different switching threshold at the edge than at the center. When the applied field is zero, the magnetization at the edge has a different direction than at the center; this is the edge "curl."

Of most interest is that part of the film where $f(x)$ is a maximum; that is at the film edge. In this part of the film the magnetization will be most influenced by the demagnetizing field. The equation for this region, a narrow band around the rim, is:

$$H_T \cos \theta - H_L \sin \theta = H_k \sin \theta \cos \theta$$
$$- H_o(0) \sin (\theta + \beta) \cos (\theta + \beta) \qquad (6)$$

where $H_o(0)$ is a constant for a given film.

Figure 4:
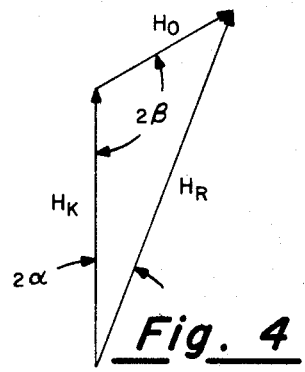
FIG. 4 is a vector diagram utilized to add the amplitude of two anisotropy fields of the form sin $2\theta$.

The right hand side of Eq. 6 can be rewritten in a simpler form; it is only necessary to observe that: (a) $2 \sin \theta \cos \theta = \sin 2\theta$; (b) the two terms have the same frequency in $\theta$ but differ only by the phase constant $2\beta$ (that is, if the two torques on the right were measured on a torque magnetometer, they would both show up a sin $2\theta$ curves differing only by a phase constant); (c) two sine waves of the same frequency but of different phases and amplitudes yield a sine wave of the same frequency. Thus Eq. 6 can be written as $$H_T \cos \theta - H_L \sin \theta = H_r \sin (\theta + \alpha) \cos (\theta + \alpha) \qquad (7)$$

where $$H_r^2 = H_k^2 + H_o(0)^2 - 2H_o(0) H_k \cos 2\beta$$
$$\cos 2\alpha = (H_r^2 + H_k^2 - H_o^2)/2H_r H_k$$

where the value of $H_r$ and $\alpha$ can be found from the usual vector diagram for adding sine waves of different phases and amplitudes used in AC circuits (see FIG. 4). The advantage of using Eq. 7 instead of the equivalent Eq. 6 is that Eq. 7 treats the combination of the demagnetizing field and the anisotropy field as a single resultant anisotropy field, $H_r$, with its easy axis differing from the average field-induced easy axis by angle $\alpha$.

EXPERIMENTAL CURVES OF $\alpha$ VS. $\beta$

Both sides of Eq. 7 must vanish when the applied field is zero. In this case $\alpha = \theta$. A Lorentz micrograph of a film in zero field thus yields a curve of $\alpha$ vs. $\beta$. In FIG. 5 are plotted the experimental points from one micrograph together with a theoretical curve obtained from Eq. 7 and FIG. 4. The agreement is closed. In FIG. 6 are plotted experimental points from a film with a very large amount of inhomogeneity. The scatter in the data is due to the inhomogeneity in the magnitude of the anisotropy field and in the easy axis orientation of this film. The good agreement of the theory and data in FIG. 5 indicates the theory has value even when the condition $H_0 \ll H_k$ is not satisfied.

NUCLEATION OF A REVERSE DOMAIN

A reverse domain forms at the edge of a film when the sum of the demagnetizing field plus the applied field becomes strong enough to nucleate a reverse domain. In some films the demagnetizing field at the edge is so strong that reverse domains are always present when the applied field is zero. For other films, with gentler tapers (as in FIG. 2) this is not true. It is assumed that the reverse domain forms by rotation at the rotational switching threshold of Eq. 7. This switching threshold is $$(H \cos(\gamma - \alpha))^{2/3} + (H \sin(\gamma - \alpha))^{2/3} = H_r^{2/3}$$

where $\gamma$ is the angle between the applied field and the easy axis.

For a given direction of applied field the switching threshold will depend on $\beta$, that is, the position along the edge of a circular film. This is shown in the theoretical curves of FIGS. 7 and 8. Thus when the applied field is in the easy direction ($\gamma = 0$), the reverse domain is most likely to form at $\beta \approx 25°$ for $H_0/H_k = 0.1$ and at $\beta \approx 15°$ for $H_0/H_k = 0.3$. Kerr observations show indeed that the reverse domains do start at such finite values of $\beta$ rather than at $\beta = 0$.

Figure 9:
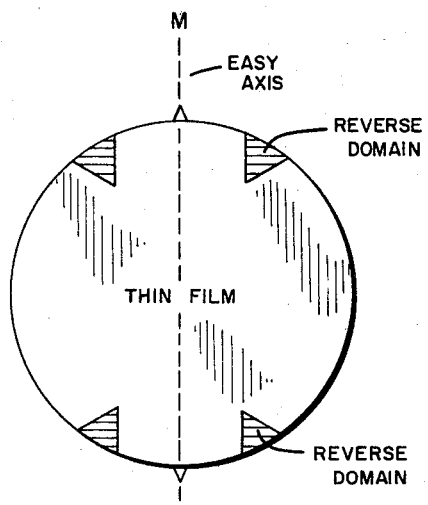
FIG. 9 is an illustration of a typical orientation of initial reverse domains as revealed by the Kerr effect.

According to this theory the initial reverse domain forms by partial rotation. In a partial rotation process the walls enclosing the reversed domain are nearly perpendicular to the direction of the magnetization just before the formation of the domain. Thus the walls of the reverse domain should not run parallel to the easy axis, but should be inclined to that axis as shown in FIG. 9. This orientation of the walls is what is seen in Kerr observations. The theory predicts also the nucleation field will increase when $H_k$ is increased, and by the same amount; that is, if initially $H_c = 2$ oe. and $H_k = 4$ oe. and if the film is then strained uniformly so that $H_k$ becomes 5 oe., then $H_c$ ought to be 3 oe. Here the theory fails: experiments with uniformly strained films show that $H_c$ does indeed increase when $H_k$ is increased, and that $H_c$ does decrease when $H_k$ is decreased, but that the quantitative change in $H_c$ is less than that predicted by the theory, and that the increase is not linear. Thus there is a qualitative but not a quantitative agreement between theory and experiment. A probable cause of this lack of agreement is the presence of defects, such as holes or bumps, that provide nucleating sites for reverse domains.

SHARP FILMS

In general, wall motion switching is to be avoided. For this reason the higher the nucleation threshold is, the better. The curves of FIGS. 7 and 8 show that areas with low values of $\beta$, the angle between the edge normal and the easy axis, have lower nucleation fields than areas with high $\beta$. This can be understood from the shape anisotropy approximation for the edge which was derived above.

An anisotropy field can result from the shape of a ferromagnetic body; for example, a needle of ferromagnetic material has a shape anisotropy field with an easy axis parallel to the direction of the needle. Likewise the edge area of a thin film has a shape anisotropy field with an easy axis parallel to the edge. This anisotropy field must be added to the field-induced anisotropy field as in FIG. 4 and Eq. 7 to obtain the resultant anisotropy field at the edge, $H_r$, and the resultant easy axis which makes an angle $\alpha$ with the field-induced easy axis. Where the edge is parallel to the field-induced easy axis ($\beta = 90°$), the two anisotropy fields add, and $H_r = H_k + H_0$. Where the edge is perpendicular to the field-induced anisotropy ($\beta = 0°$), the resultant anisotropy field is the difference between the two: $H_r = H_k - H_0$. That is why the curves of FIGS. 7 and 8 show that areas with low $\beta$ have lower nucleation fields than areas with high $\beta$. Where the edge is neither parallel or perpendicular to the easy axis of the field induced anisotropy, there $H_r$ will have an intermediate value and the resultant easy axis will be skewed.

Circular films have all values of $\beta$, and thus all the various properties mentioned above. However, if a mask designed so that the shape of the film is such that the edge of the film makes a reasonably small angle with the field-induced easy axis, the resultant anisotropy at the edge would be large, not small, and the skew in those areas would be slight. One possible such planar contour is that of film 1 of FIG. 10. Such film 1 ought to have a larger $H_c$ and should be more resistant to creep, since both phenomena require an initial reverse domain to form before they can proceed.

Figure 11A:
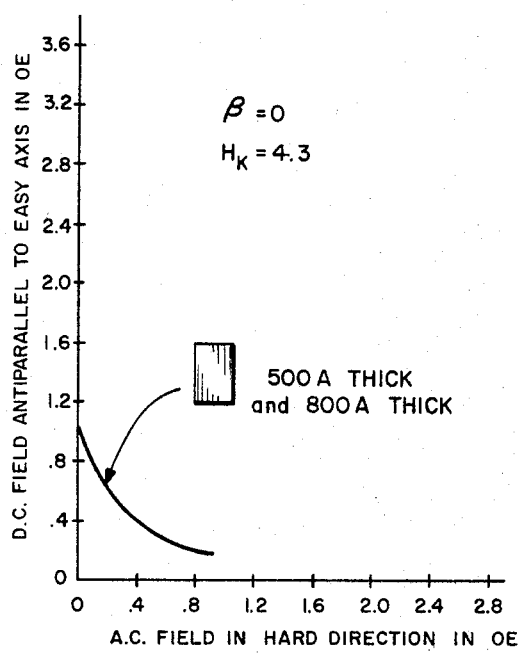
FIGS. 11a through 11d are plots of the creep threshold curves for thin films of various planar contours and magnetic and physical characteristics.
Figure 11B:
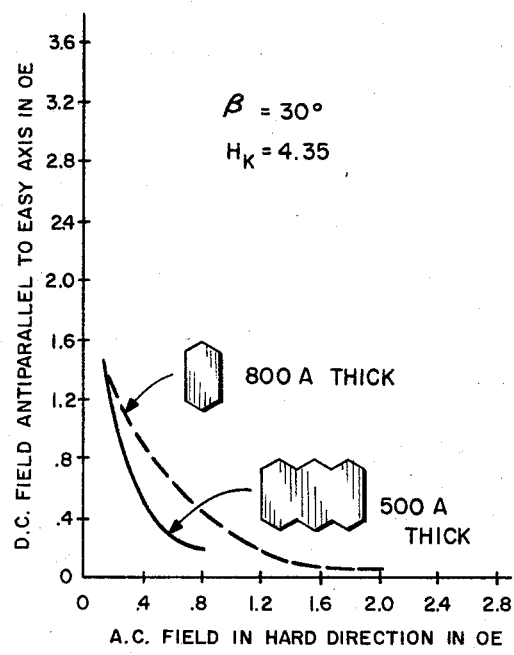
Figure 11C:
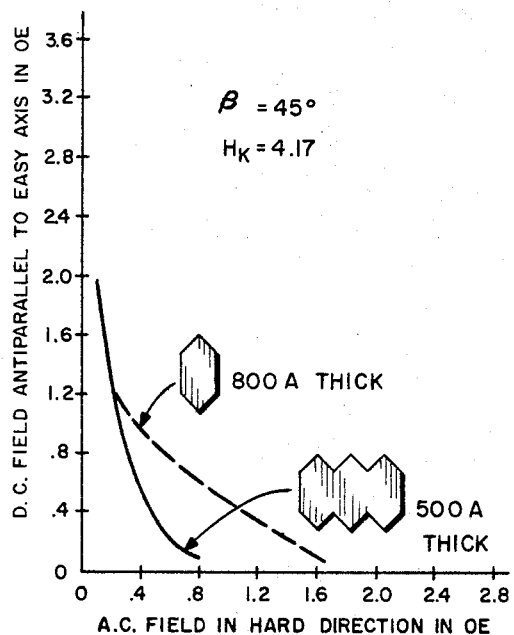
Figure 11D:
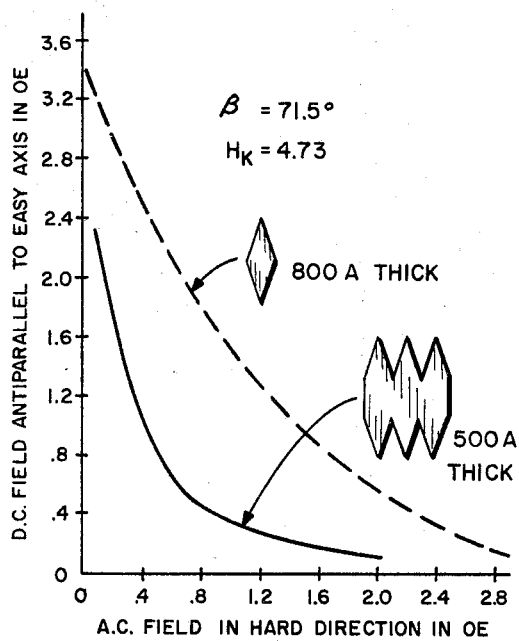

With particular reference to FIG. 11a–11d there are plotted the creep thresholds of thin films of various planar contours and magnetic and physical charactistics as particularly designated in each figure with the value of $\beta$ being the largest angle between the line normal to the film edge and the film's easy axis M. Comparison of the graphs of FIG. 11b–11d to the graph of FIG. 11a illustrates the substantial increase of the creep threshold in a sharp film over that of a rectangular film—see FIG. 11a.

Figure 13:
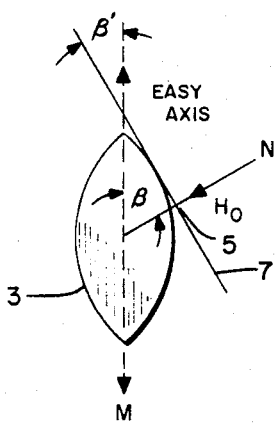
FIG. 13 is an illustration of a third planar contour of a sharp film.
Figure 12:
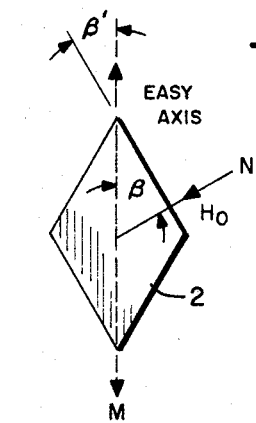
FIG. 12 is an illustration of a second planar contour of a sharp film.

With particular reference to FIGS. 12 and 13 there are illustrated two additional planar contour forms of films 2 and 3, respectively, with no limitation thereto intended. In FIGS. 12 and 13 there is illustrated an angle $\beta'$ that is the angle that is complementary to the angle $\beta$, or $$\beta' + \beta = 90°$$

Film 3 of FIG. 13 is a sharp film with curved edges with the normal to the edge N—see edge normal of FIG. 1—defining the point 5 at the film edge at which a line 7 is tangential to the film's edge, which line 7 with the film's easy axis M defines the angle $\beta'$. Inspection of FIGS. 11a–11d indicates that for the optimum planar contours thin films should be designed having:

$$45° < \beta \leq 90°$$
$$0° \leq \beta' < 45°$$

Figure 10:
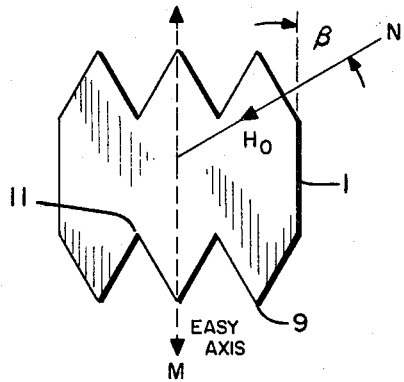
FIG. 10 is an illustration of the planar contour of one form of a sharp film.

As is self evident, minor deviations from such limitations may be permitted; such as the rounding off of abrupt changes of direction of the film edge as at points 9 and 11 FIG. 10, point 13 of FIG. 12 and point 15 of FIG. 13.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims.

What is claimed is:
1. A sharp film, comprising:
   a multi-stable-state open flux path film of thin ferromagnetic material having single domain properties capable of providing single domain rotational switching and possessing the characteristic of uniaxial anisotropy providing a magnetic easy axis M along which the film's remanent magnetization shall reside wherein for all points on the film's edge the angle $\beta'$ between the film's edge and the film's easy axis is equal to or greater than 0° and less than 45°.
2. A sharp film, comprising:
   a multi-stable-state open flux path film of thin ferromagnetic material having single domain properties capable of providing single domain rotational switch- ing and possessing the characteristic of uniaxial anisotropy providing a magnetic easy axis M along which the film's remanent magnetization shall reside wherein for all points on the film's edge the angle $\beta$ between a line normal to the film's edge and the film's easy axis is greater than 45° and equal to or less than 90°.

References Cited

UNITED STATES PATENTS 3,092,813  6/1963  Broadbent _____ 340—174

OTHER REFERENCES

Armed Services Technical Information Agency, "Low Power Thin Magnetic Film Memory," Interim Engineering Report No. 2 by T. J. Matcovich.

STANLEY M. URYNOWICZ, JR., *Primary Examiner.*